United States Patent [19]
Rader et al.

[11] Patent Number: 5,592,357
[45] Date of Patent: Jan. 7, 1997

[54] ELECTROSTATIC CHARGING APPARATUS AND METHOD

[75] Inventors: Mark S. Rader, Knoxville; Igor Alexeff, Oak Ridge; Peter P. Tsai; Larry C. Wadsworth, both of Knoxville, all of Tenn.

[73] Assignee: The University of Tennessee Research Corp., Knoxville, Tenn.

[21] Appl. No.: 119,358

[22] Filed: Sep. 10, 1993

Related U.S. Application Data

[63] Continuation-in-part of Ser. No. 958,958, Oct. 9, 1992, Pat. No. 5,401,446.

[51] Int. Cl.$^6$ ........................................ H05F 3/00
[52] U.S. Cl. ............................ 361/225; 361/229
[58] Field of Search ................... 361/212, 213, 361/214, 220, 221, 222, 225, 227, 228, 229

[56] References Cited

U.S. PATENT DOCUMENTS

| | | | |
|---|---|---|---|
| 1,169,428 | 1/1916 | Rogers | 361/213 |
| 1,394,064 | 10/1921 | Chapman | 361/214 |
| 2,327,695 | 8/1943 | Beregh | 361/213 |
| 2,333,213 | 11/1943 | Slayter . | |
| 2,740,184 | 4/1956 | Thomas . | |
| 3,111,605 | 11/1963 | Muller et al. | 361/213 |
| 3,308,344 | 3/1967 | Smith et al. | 361/213 |
| 3,643,128 | 2/1972 | Testone . | |
| 4,048,364 | 9/1977 | Harding et al. . | |
| 4,088,731 | 5/1978 | Groome . | |
| 4,215,682 | 8/1980 | Kubik et al. . | |
| 4,239,973 | 12/1980 | Kolbe et al. . | |
| 4,375,718 | 3/1983 | Wadsworth et al. . | |
| 4,513,049 | 4/1985 | Yamasaki et al. . | |
| 4,534,918 | 8/1985 | Forrest, Jr. . | |
| 4,588,537 | 5/1986 | Klasse et al. . | |
| 4,592,815 | 6/1986 | Nakao . | |

(List continued on next page.)

FOREIGN PATENT DOCUMENTS

| | | |
|---|---|---|
| 245108 | 11/1987 | European Pat. Off. . |
| 305620 | 8/1989 | European Pat. Off. . |
| 448929 | 10/1991 | European Pat. Off. . |
| 1914780 | 10/1970 | Germany . |
| 480202 | 1/1976 | U.S.S.R. ................. 361/213 |
| 1493283 | 11/1977 | United Kingdom . |

OTHER PUBLICATIONS

Adams, J. W. C., "Specialty Nonwovens with Enhanced Filtration Performance", *INDA Association of the Nonwoven Fabrics Industry* (undated).

Ando, Katsutoshi, "Synthetic Electret Filter Media for HEPA Filtration", *INDA Association of the Nonwoven Fabrics Industry* (undated).

Szuchi, Edward, "Contribution to the Production of Melt-Blown Nonwovens", *Mellian English Apr. 1991—Translation of Melliland Textiberichte* 72 (1991), p. 270.

Van Turnhout, J., "Electret Filters for High–Efficiency Air Cleaning" *Journal of Electrostatics,* 8 (1980), pp. 369–379.

*Primary Examiner*—Fritz M. Fleming
*Attorney, Agent, or Firm*—Weiser & Associates, P.C.

[57] ABSTRACT

A pair of electrodes are biased to produce an electrostatic discharge while placing a thin non electron absorbing gas layer near one or both of the electrodes which are used to develop the electric field. As a result, atmospheric oxygen, water vapor and other contaminants are removed from the regions surrounding the electrodes, allowing ionization to occur more easily. This is accomplished with an electrode structure including a hollow tube for receiving a gas, a plurality of apertures extending through the hollow tube for delivering the gas to the surface of the hollow tube, and the application of a biasing voltage for producing an electrostatic discharge in the presence of the gas. The tube can take the form of a longitudinally extending structure, or a hollow shell, depending upon the configuration of the electrostatic charging apparatus with which the electrode structure is used.

32 Claims, 10 Drawing Sheets
(9 of 16 Drawing(s) in color)

U.S. PATENT DOCUMENTS

| | | |
|---|---|---|
| 4,626,263 | 12/1986 | Inoue et al. . |
| 4,874,659 | 10/1989 | Ando et al. . |
| 4,904,174 | 2/1990 | Moosmayer et al. . |
| 4,997,600 | 3/1991 | Okumura et al. . |
| 5,051,159 | 9/1991 | Togashi et al. . |
| 5,116,444 | 5/1992 | Fox . |
| 5,122,048 | 6/1992 | Deeds . |
| 5,227,172 | 7/1993 | Deeds . |
| 5,244,482 | 8/1993 | Hassenboehler et al. . |
| 5,401,446 | 3/1995 | Tsai et al. . |

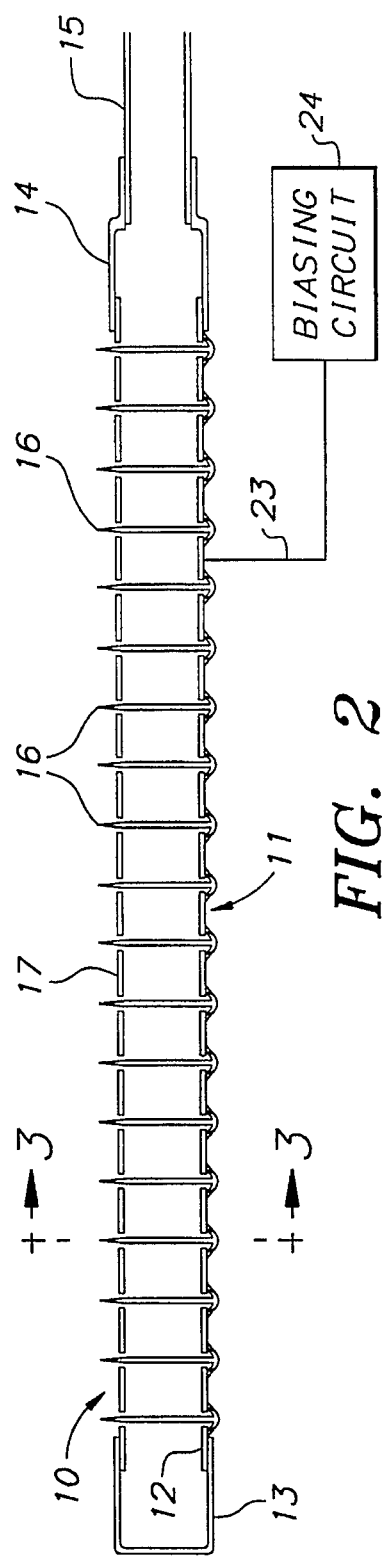
FIG. 2
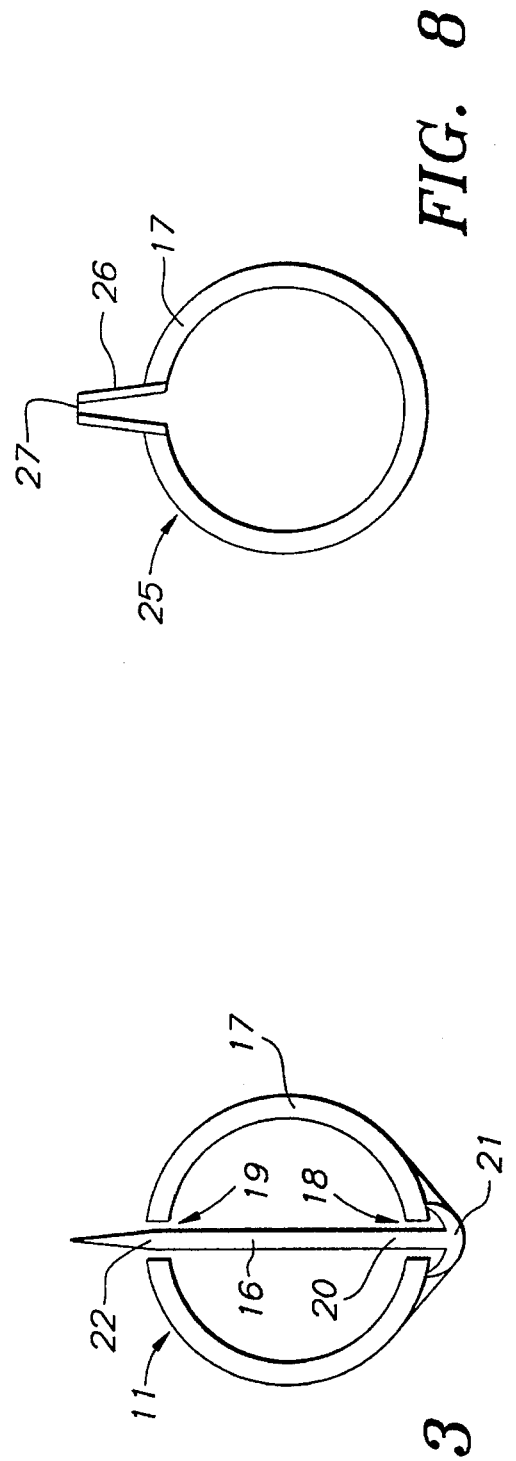
FIG. 8
FIG. 3

ELECTROSTATIC CHARGING APPARATUS AND METHOD

RELATED CASES

This application is a continuation-in-part of prior U.S. patent application Ser. No. 07/958,958, now U.S. Pat. No. 5,401,446 filed Oct. 9, 1992 and entitled "METHOD AND APPARATUS FOR THE ELECTROSTATIC CHARGING OF A WEB OR FILM". The subject matter disclosed in this prior U.S. patent application is incorporated by reference as if fully set forth herein.

FIELD OF THE INVENTION

The present invention relates generally to methods and apparatus for developing electrostatic charges, and more particularly, to methods and apparatus for the electrostatic charging of webs or films.

BACKGROUND OF THE INVENTION

The use of electrically charged fibrous materials as a filtration medium has been known for some time. Various methods and apparatus for preparing electrically charged webs and films are disclosed in U.S. patent application Ser. No. 07/958,958. Further disclosed in this U.S. patent application is the discovery that a suitable web or film may be conveniently cold charged by sequentially subjecting the web or film to a series of electric fields such that adjacent electric fields have substantially opposite polarities with respect to each other. Also disclosed are alternative apparatus for implementing such a process.

Generally speaking, such improvements are achieved by directing a web or film which is to be electrostatically charged between a coupled pair of conducting bodies. One of the conducting bodies can, if desired, serve to direct the web or film through the charging apparatus. The other conducting body combines to develop a potential difference such that ionization and corona occurs. This, in turn, creates an electric field (E) between the conducting bodies which is dependent upon the shape and the distance between the surfaces of the conducting bodies. This electric field is a vector (directional) quantity, and is generally measured in terms of volts per meter.

Such improvements are implemented with conducting bodies which include a charging bar spaced relative to either a charging drum (for receiving the web or film) or a charging shell (for overlying the web or film), which are appropriately biased relative to one another to develop the electric fields which are desired. While providing satisfactory results, it has been found that such apparatus is capable of improvement to achieve enhanced electrostatic charging of the webs and films which are to be treated.

To better understand the improvements of the present invention, a brief discussion of the mechanisms which contribute to ionization and corona is appropriate. To this end, as the above-discussed electric field is developed, charged particles are created in the region of the electric field by some appropriate process such as a cosmic ray or some other natural radiation source. Each particle is accelerated by the electric field along the vector direction which is defined by the electric field. If sufficient energy is gained by the charged particle before that charged particle collides with a gas atom, an electron is removed from the atom and is made available for acceleration and further ionizations.

This breakdown process is characterized by several "loss" mechanisms. This includes:

1) capture of electrons by heavy oxygen atoms,
2) collision with the electrodes' "current flow", and
3) movement of particles out of the electric field.

If the first and third loss mechanisms are large in comparison to the number of charged particles which are created, the result is what is known as a "corona current" (i.e., a low current flow at a very high voltage). However, this type of current flow is very unstable, and is likely to lead to arcing. If the second loss mechanism becomes dominant, the result is an arc, which is both uncontrollable and destructive to the end product. Clearly, such an occurrence is to be avoided.

SUMMARY OF THE INVENTION

It is therefore the primary object of the present invention to produce an intense corona while reducing the potential for arcing.

It is also an object of the present invention to produce an intense corona which provides a more efficient, stable discharge at atmospheric pressure.

It is also an object of the present invention to produce an intense corona with a reduced capability for arcing which is characterized by an intense corona current at lower voltages.

It is also an object of the present invention to produce an intense corona current at reduced voltages to help reduce the potential for arcing and provide a more efficient, stable discharge at atmospheric pressure.

It is also an object of the present invention to produce an intense corona current at reduced voltages to help reduce the potential for arcing and provide a more efficient, stable discharge at atmospheric pressure, for electrostatically charging an advancing web or film.

These and other objects which will become apparent are achieved in accordance with the present invention by placing a thin non electron absorbing gas layer near one or both of the electrodes which are used to develop the electric field of an electrostatic charging apparatus. It has been found that this operates to increase the ionization efficiency and lower the voltage required to produce a corona discharge. This results from the removal of atmospheric oxygen, water vapor and other contaminants from the regions surrounding the electrodes to allow ionization to occur more easily. Once ionization occurs, excess charged particles cannot be lost until they collide with a solid body, preferably the remaining electrode, achieving the desired result. It has been found that this applies to both AC and DC voltages.

Placement of a thin non electron absorbing gas layer in the vicinity of an electrode is advantageously accomplished by various means. For example, the charging bar can be replaced with a longitudinally extending tube having spaced apertures for delivering a gas to the discharge-forming elements of the electrode. These discharge-forming elements can include either a series of pins which extend through the spaced apertures of the tube, or a series of nozzles which project from the surface of the tube. In either case, this places the gas in the vicinity of the pins, or the nozzles, which in turn receive appropriate biasing voltages for developing the electric field which is to produce the improved discharge of the present invention. Alternatively, the charging shell can be replaced with a hollow body which similarly incorporates a series of apertures, and a cooperating series of pins or nozzles, to achieve a similar result.

For further detail regarding the method and apparatus of the present invention, reference is made to the detailed description which is provided below, taken in conjunction with the following illustrations.

BRIEF DESCRIPTION OF THE DRAWINGS

The file of this patent application contains drawings executed in color. Copies of this patent with color drawings will be provided by the Patent and Trademark Office upon request and payment of the necessary fee.

FIG. 2 is a cross-sectional view of the ionizing electrode of the apparatus of FIG. 1, taken along the line 2—2.

FIG. 3 is a cross-sectional view of the ionizing electrode of FIG. 2, taken along the line 3—3.

FIG. 4A shows such operation in the absence of a web of material. FIG. 4B shows such operation in the presence of a web of material.

FIG. 5A shows such operation in the absence of a web of material. FIG. 5B shows such operation in the presence of a web of material.

FIG. 8 is a cross-sectional view similar to FIG. 3, which shows alternative means for delivering a non electron absorbing gas layer to the ionizing electrode.

DETAILED DESCRIPTION OF PREFERRED EMBODIMENTS

Figure 1:
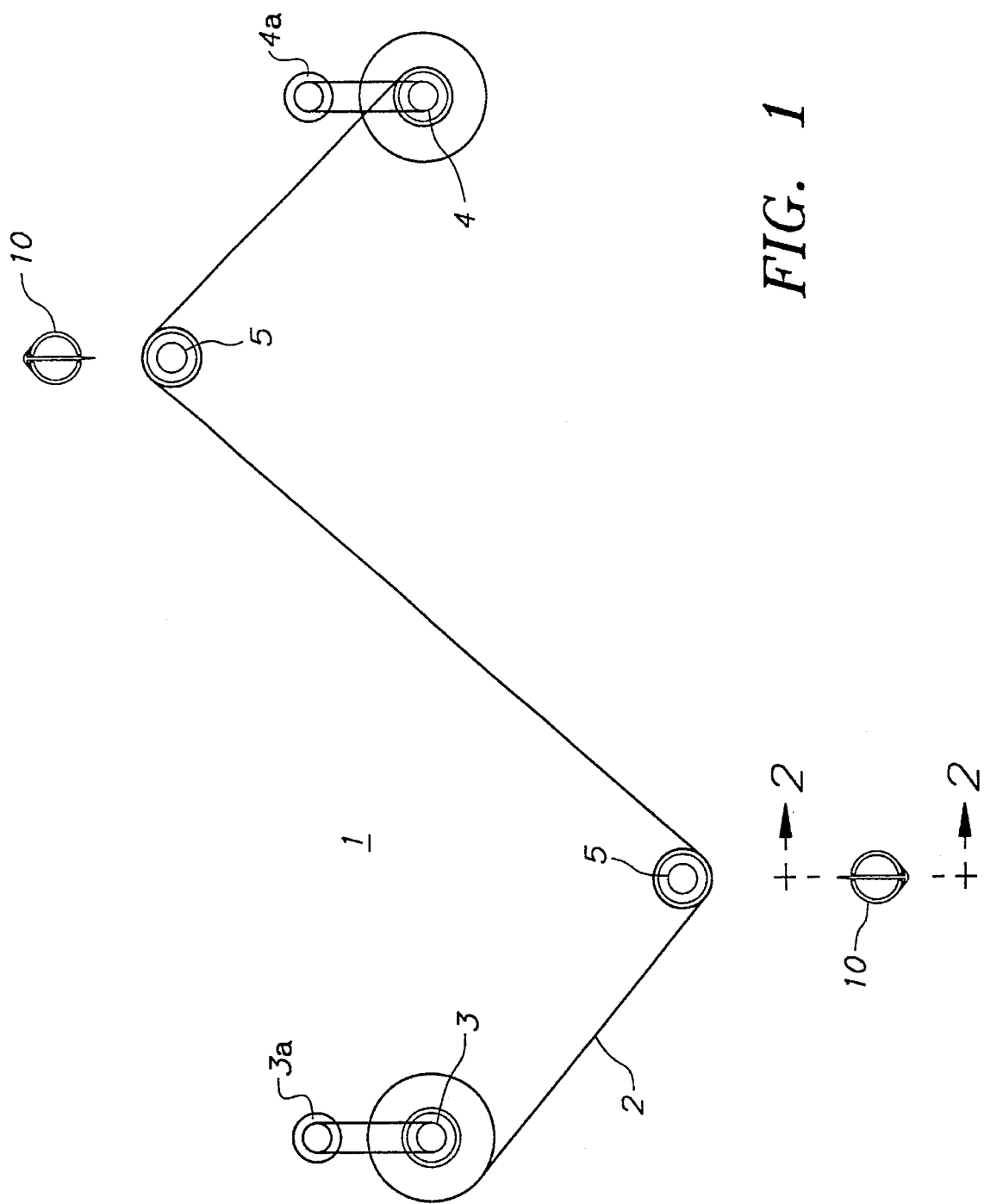
FIG. 1 is a schematic illustration of an apparatus for drawing a web or film through an electrostatic charging apparatus produced in accordance with the present invention.

FIG. 1 schematically illustrates an apparatus 1 for electrostatically charging a web 2 of material (or a film) in accordance with the present invention. Generally speaking, the web 2 is initially received upon a feed spool 3 (rotated by a motor 3a) and is subsequently wound upon a take-up spool 4 (rotated by a motor 4a), using apparatus which is per se known. As disclosed in U.S. patent application Ser. No. 07/958,958, as the web 2 progresses from the feed spool 3 to the take-up spool 4, the web 2 is caused to traverse a pair of rollers 5. In addition to directing the web 2 through the apparatus 1, the rollers 5 also serve as electrodes for electrostatically charging the web 2. Such electrostatic charging is accomplished in combination with a second pair of electrodes, which are associated with the rollers 5 and which will hereinafter be referred to as ionizing electrodes 10. Further detail regarding the manner in which the electrodes 5, 10 may be used to impart an electrostatic charge to the web 2 may be had with reference to U.S. patent application Ser. No. 07/958,958.

FIGS. 2 and 3 illustrate one of the ionizing electrodes 10 in greater detail. Each ionizing electrode 10 is generally comprised of a tubular body 11, one end 12 of which includes a cap 13 for enclosing the tubular body 11 and the other end 14 of which includes an inlet 15 for receiving a gas. A series of pins 16 extend through the wall 17 of the tubular body 11, at spaced intervals along the tubular body 11. The number of pins 16 which are employed, as well as their relative spacing along the tubular body 11, is capable of variation depending upon the application which is involved, as well as the width of the web 2 which is to be treated in accordance with the present invention.

The pins 16 are advantageously passed through opposing apertures 18, 19 formed in the wall 17 of the tubular body 11. One end 20 of each pin is provided with a head 21 which is sufficiently large to overly the aperture 18 which is to receive the pin 16. A gas tight seal is formed between the head 21 and the aperture 18, making use of any of a variety of sealing compounds which are resistant to gas flow. The opposing end 22 of each pin projects through the aperture 19 and extends beyond the wall 17 of the tubular body 11. In this fashion, a flow of gas is permitted to pass between the end 22 of the pin 16 and the aperture 19 of the wall 17, providing a thin non electron absorbing gas layer near the end 22 of the pin 16, as is desired in accordance with the present invention.

Each of the pins 16 are formed of an electrically conducting material to receive applied voltages for producing an effective discharge (schematically shown as an electrical connection 23 for communicating with an appropriate biasing circuit 24). The tubular body 11 which receives the pins 16 can either be formed of an electrically conducting material, for applying uniform voltages to the pins 16, or an electrically non-conducting material provided appropriate electrical connections are provided for biasing the individual (and isolated) pins 16. To be noted is that this latter system (electrically non-conducting tubular body) has the added advantage of permitting the series of pins 16 to be separately biased (electrically), which in turn permits tailored control of the resulting discharge.. For example, separate biasing of the pins 16 can allow adjustments to be made which will ensure a uniform discharge along the length of the tubular body 11 irrespective of nonuniformities present in the system (e.g., differences in the pins, differences resulting from mounting variations, differences in gas flow, the material being processed, etc.). Separate biasing of the pins 16 can also allow spatial shaping or gradation of the discharge of the ionizing electrode 10 in the event that a graduated discharge is found to be useful for a particular application. For example, it has been found that in the presence of a gas, the currents developed by the system will tend to increase by a factor of 10 or more. This can have an effect upon the uniformity of the discharge which results if different amounts of gas are discharged along the tubular body 11, moving away from the inlet 15. Separate biasing of the pins 16 can correct for these variations, if necessary. Other applications may call for a graduated discharge which is greater toward the center of the tubular body than at its end portions. Other variants may also be called for, depending upon the application which is involved.

In operation, the pins 16 are biased to a high voltage to create a high electric field (either through biasing of a conductive tubular body, or through separate biasing of the pins of a non-conducting tubular body). A suitable gas is then introduced to the inlet 15, which in turn flows down the tubular body 11 and escapes through the apertures 19, passing between the pins 16 and the wall 17 of the tubular body 11. Any of a variety of gases can be used for this purpose, including relatively inert gases such as argon, helium, neon and nitrogen, and even combustible gases such as propane. Electronegative gases such as those containing oxygen cannot be used for this purpose, since such gases tend to de-enhance the resulting corona, but they can be used when low corona current is desired with high electric field.

Each ionizing electrode 10 is biased relative to its corresponding roller 5, which can either be grounded or biased as is more fully described in U.S. patent application Ser. No. 07/958,958. This, in turn, draws charged particles from the ionizing electrode 10 to the roller 5, drawing charged particles through the web 2 as it passes between the electrodes 5, 10. However, the flow of gas developed within the tubular body 11 and escaping through the apertures 19 causes the presence of a thin non electron absorbing gas layer in the vicinity of the ionizing electrode 10 (at the pins 16). As a result of this atmospheric oxygen and water vapor are removed from the vicinity of the ionizing electrode 10, which in turn increases the ionization efficiency and lowers the voltage required to produce a corona discharge, allowing ionization to occur more easily. The resulting corona is much more intense (by a factor of at least 10), uniform and stable resulting from the layer of gas which is present.

As previously indicated, the above-described structure is characterized by parameters which are capable of variation. The following is an example of an ionizing electrode 10 which has been produced in accordance with the present invention, and which has provided satisfactory results.

EXAMPLE

A series of 19 steel pins (16) were positioned at spaced intervals of about ¼ inch along a brass tubular body (11) for a length of 5¾ inches. The tubular body (11) had a diameter of ⅜ inch. Each of the pins (16) had a diameter of 0.02 inches and a length of ½ inch, and extended through apertures (19) having a diameter of 0.025 inch. In operation, either helium or argon was introduced within the tubular body (11) at a gas pressure of 3 to 5 psi. The electrodes (5, 10) were biased to from 10 to 12 kV, at a current of up to 2 mA (max). The electrode (5) for receiving the web (2) was grounded.

The resulting system produced an enhanced corona in the presence of the circulating gas. Webs of material exposed to this enhanced corona were also found to exhibit improved properties, as follows.

COMPARATIVE EXAMPLES

Figure 4A:
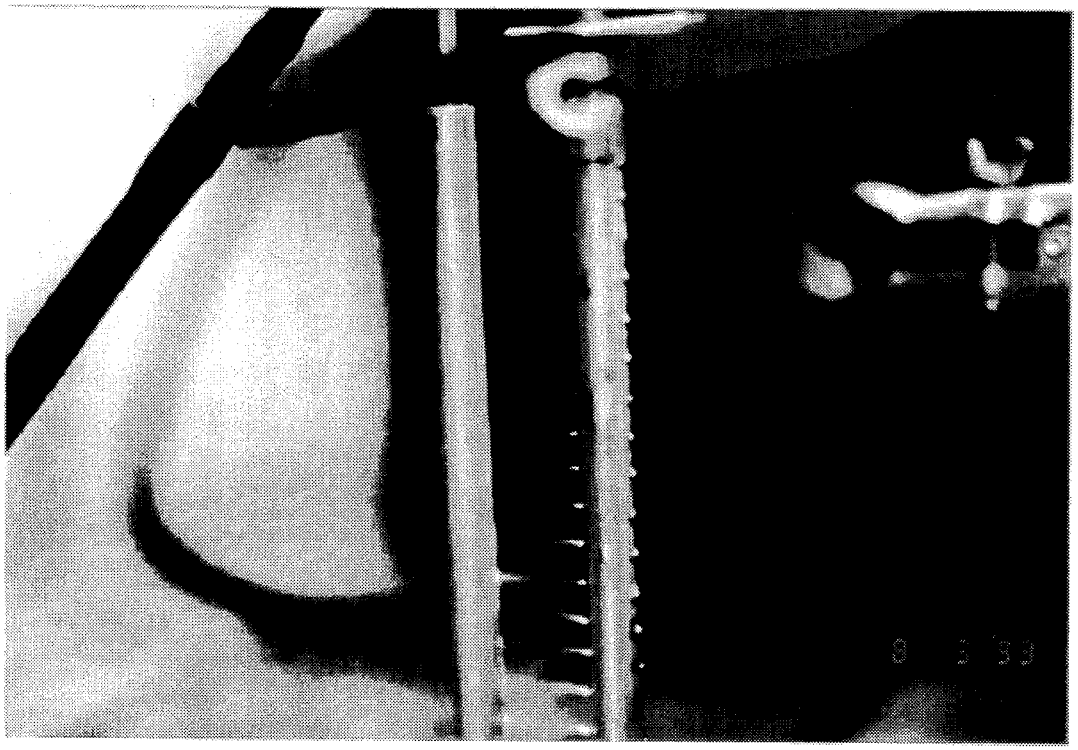
FIGS. 4A and 4B are photographs showing operation of the ionizing electrode without a flow of gas in accordance with the present invention.
Figure 4B:
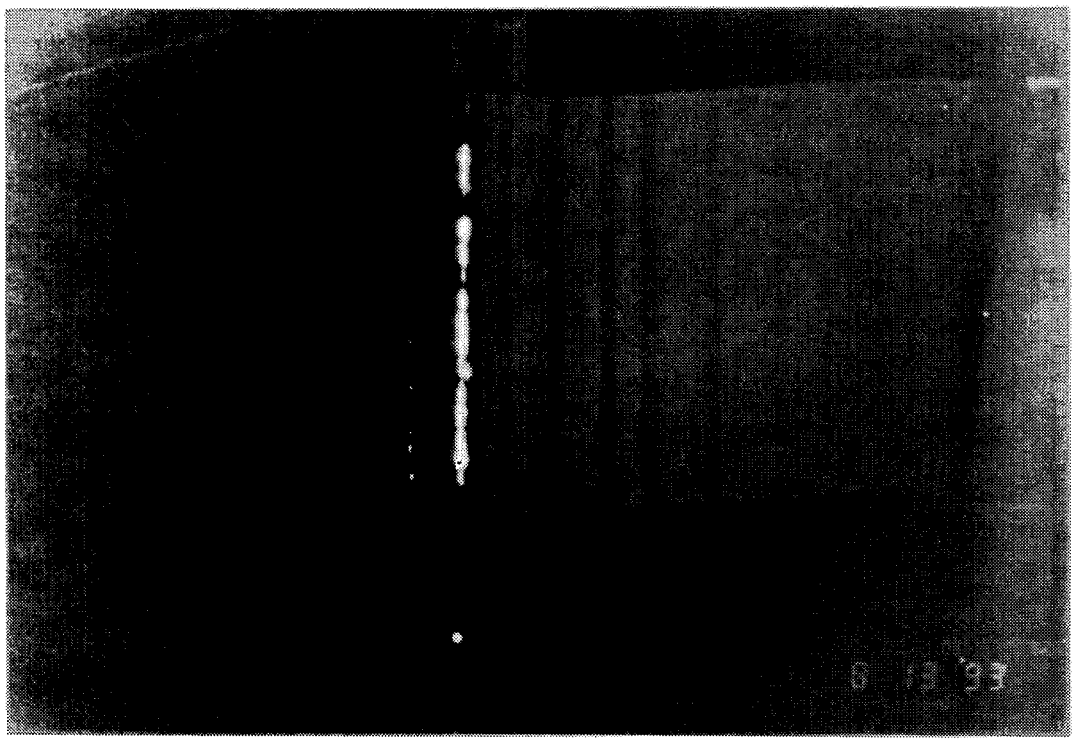
Figure 5A:
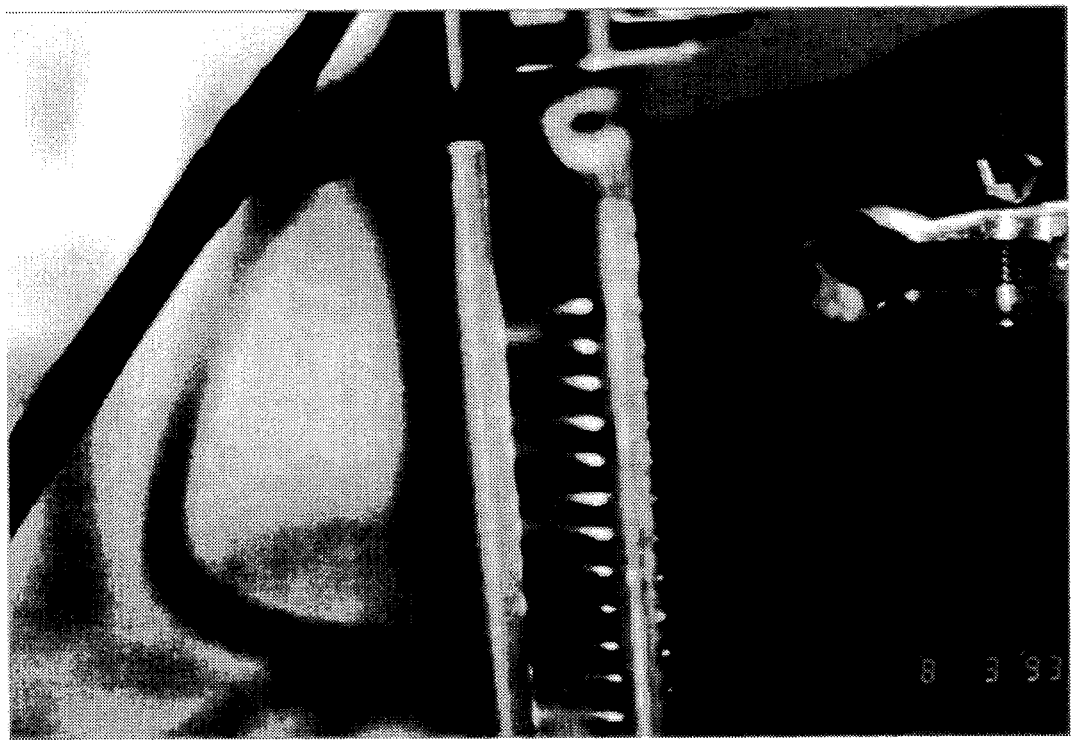
FIGS. 5A and 5B are photographs showing operation of the ionizing electrode with a flow of gas in accordance with the present invention.
Figure 5B:
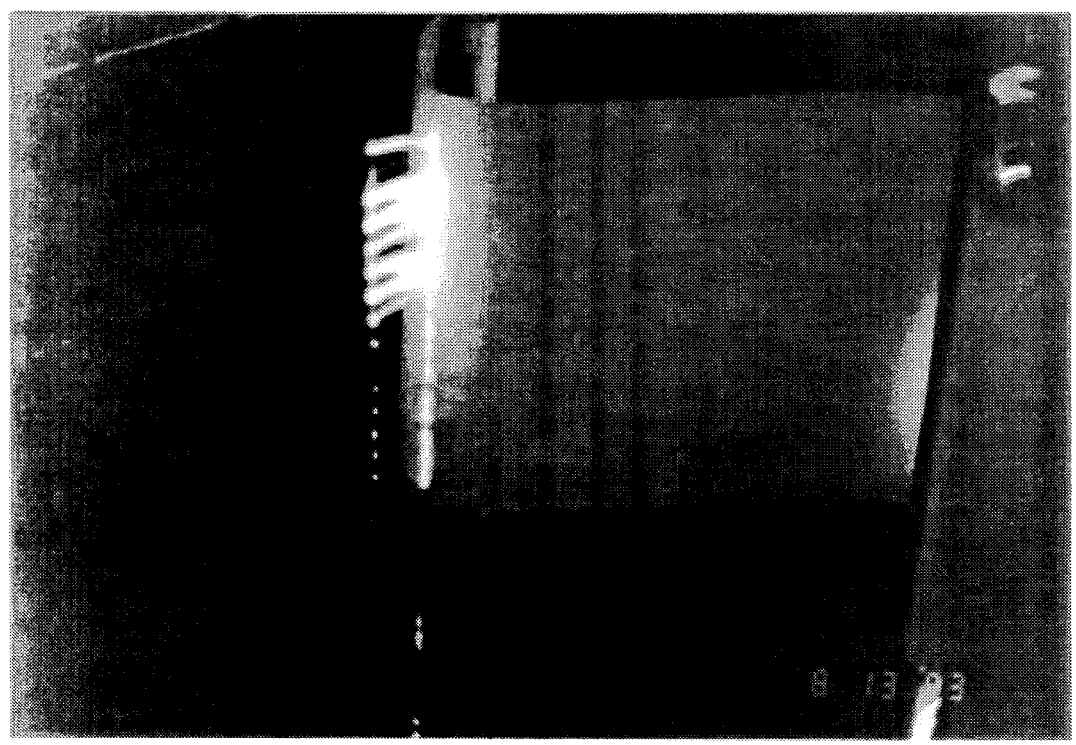

FIGS. 4A and 4B are photographs showing the discharge resulting from the apparatus 1 of FIG. 1, but without a flow of gas through the system. FIGS. 5A and 5B show corresponding discharges with a flow of gas present. FIGS. 4B and 5B correspond to FIGS. 4A and 5A, respectively, but for the addition of a web 2 between the electrodes 5, 10 (while in operation). The improvement in the resulting discharge (corona) is apparent from the increased brightness of the discharge shown in FIGS. 5A and 5B.

Such improvement is further illustrated with reference to the following tables.

TABLE 1

Improvement of Polypropylene Meltblown with Helium Feed

| Fabric Weight | Average Penetration of 0.1 micron Particles with Gas | Average Penetration of 0.1 micron Particles without Gas | Improvement Factor |
|---|---|---|---|
| .35 Oz/Yd$^2$ | 10.53% | 14.25% | 1.35 |
| 1 Oz/Yd$^2$ | 1.07% | Data Unavailable | Data Unavailable |
| 3 Oz/Yd$^2$ | 0.372% | 0.529% | 1.42 |

TABLE 2

Improvement of Polypropylene Meltblown with Helium Feed

| Fabric Weight | Average Penetration of 0.1 micron Particles with Gas | Average Penetration of 0.1 micron Particles (Ser. No. 07/958,958) | Improvement Factor |
|---|---|---|---|
| .35 oz/Yd$^2$ | 10.53% | Data Unavailable | Data Unavailable |
| 1 Oz/Yd$^2$ | 1.065% | 1.152% | 1.08 |
| 3 Oz/Yd$^2$ | 0.372% | 2.04% | 5.48 |

Figure 6:
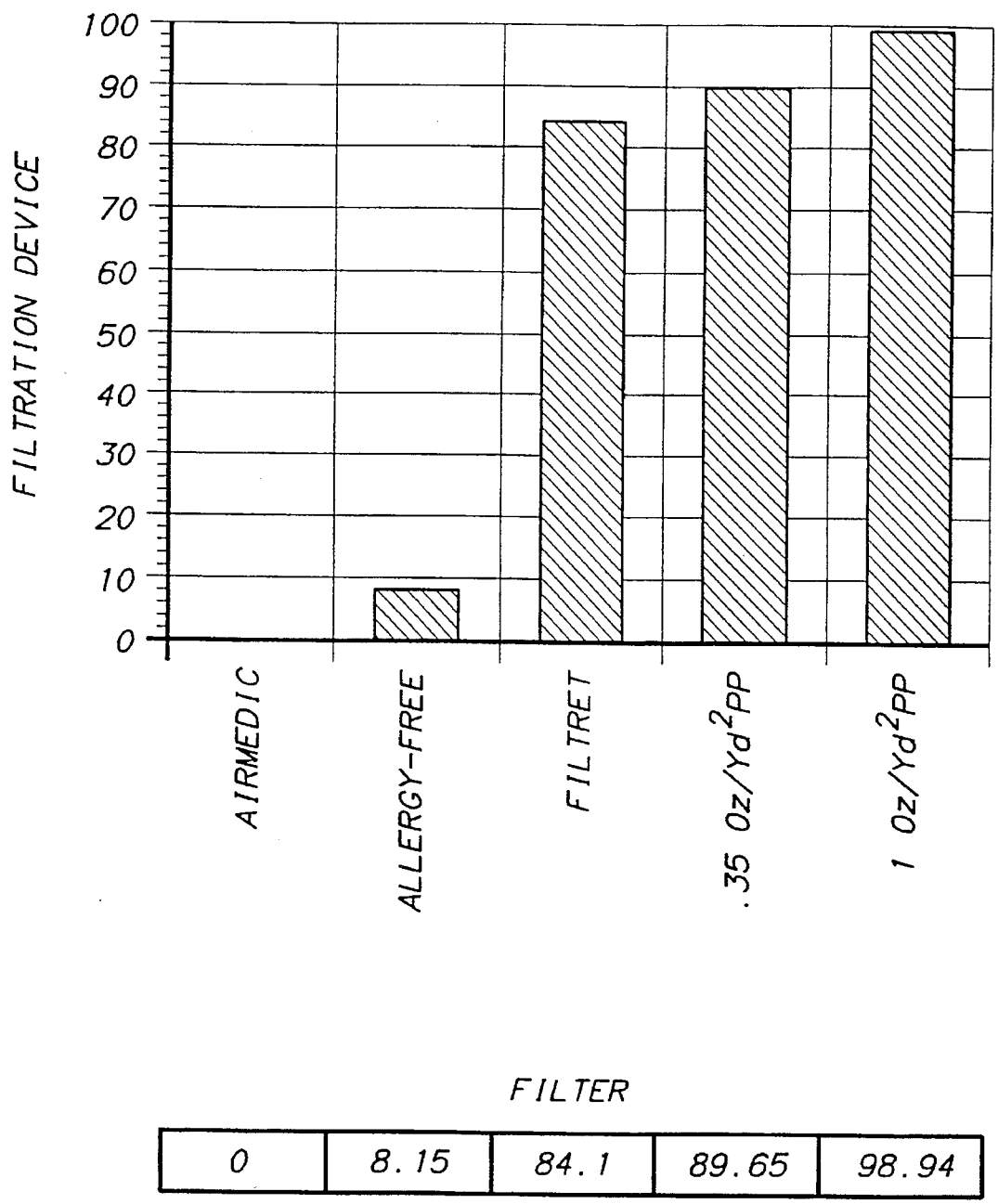
FIG. 6 is a graph comparing the filtration efficiency of webs treated in accordance with the present invention with untreated webs.

Tables 1 and 2 express average penetrations (in percent) of 0.1 micron particles in a polypropylene meltblown web. Table 1 compares average penetrations resulting from use of the apparatus 1, incorporating rollers 5, 10 as previously described, both with and without a flow of gas. Table 2 makes a similar comparison, both with and without use of the enhanced electrostatic charging techniques which are disclosed in U.S. patent application Ser. No. 07/958,958. In each case, a marked improvement is apparent, as evidenced by the improvement factor which has been calculated (as a ratio of the average penetrations measured for each of the three fabric weights which are shown). In sum, it has been found that with the improvements of the present invention, polymer materials such as polypropylene are much more efficiently charged, with no detrimental arcing and with a much higher current density concentrated in the cloth. Indeed, as shown in FIG. 6 (which compares the filtration efficiency of webs treated in accordance with the present invention with untreated webs), the resulting material can act as an efficient electret filter, removing 99% of the 0.1 micron sized particles which are present.

It has been found that the treatment of a web in accordance with the present invention enhances the wettability and the wickability of materials such as polyethylene terephthalate (PET), polypropylene, polyethylene and polyester. Indeed, for woven polyethylene, the wickability was increased by a factor of 2 (for pure water). This was demonstrated by subjecting a polyethylene material which was electrostatically charged in accordance with the present invention to standard filtration testing (one centimeter of water placed on a tightly drawn fabric) to measure the rate of spread.

Figure 7A:
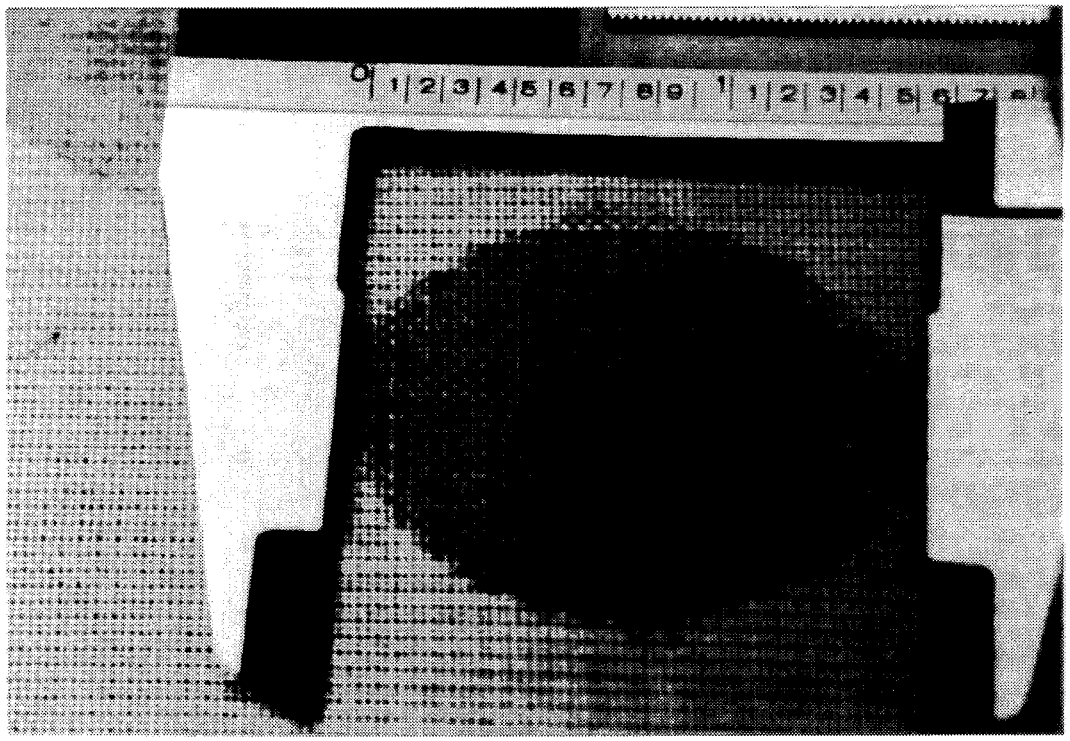
FIGS. 7A to 7E are photographs demonstrating increased wettability and wickability of materials treated in accordance with the present invention.
Figure 7B:
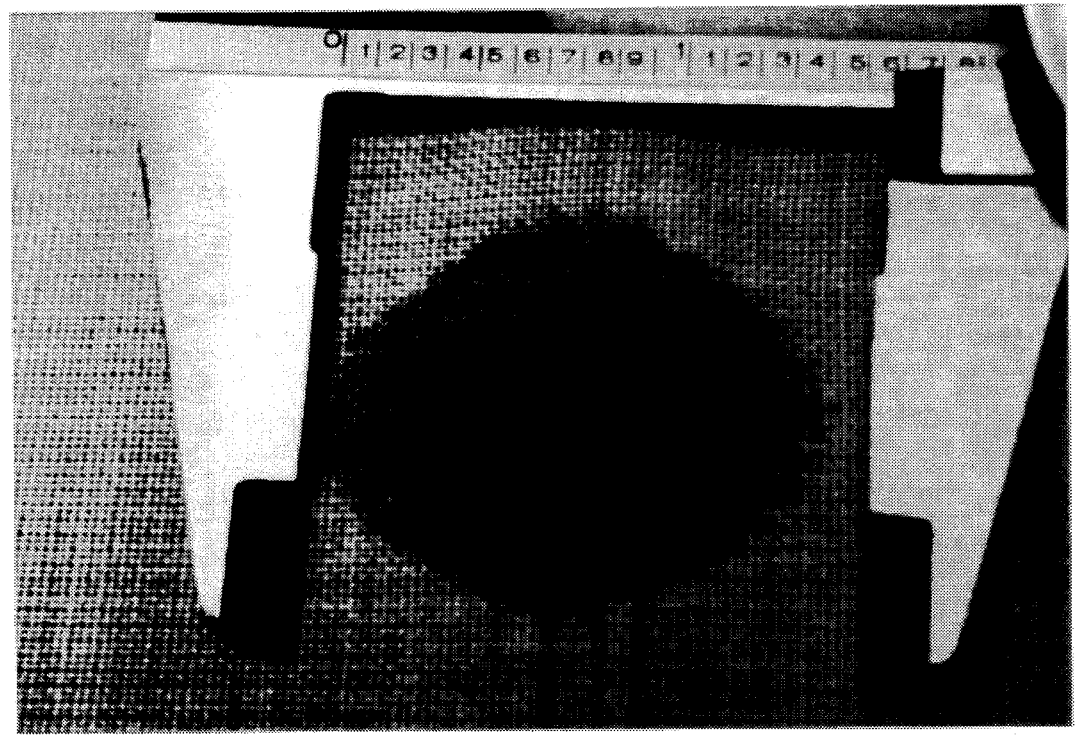
Figure 7C:
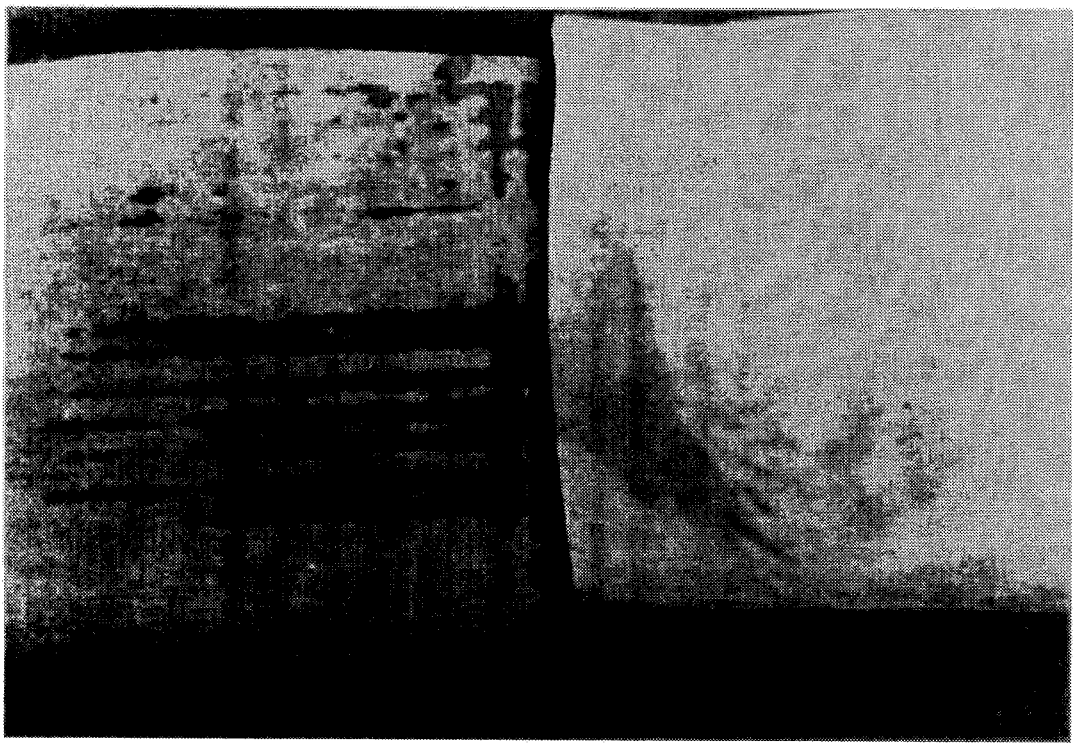
Figure 7D:
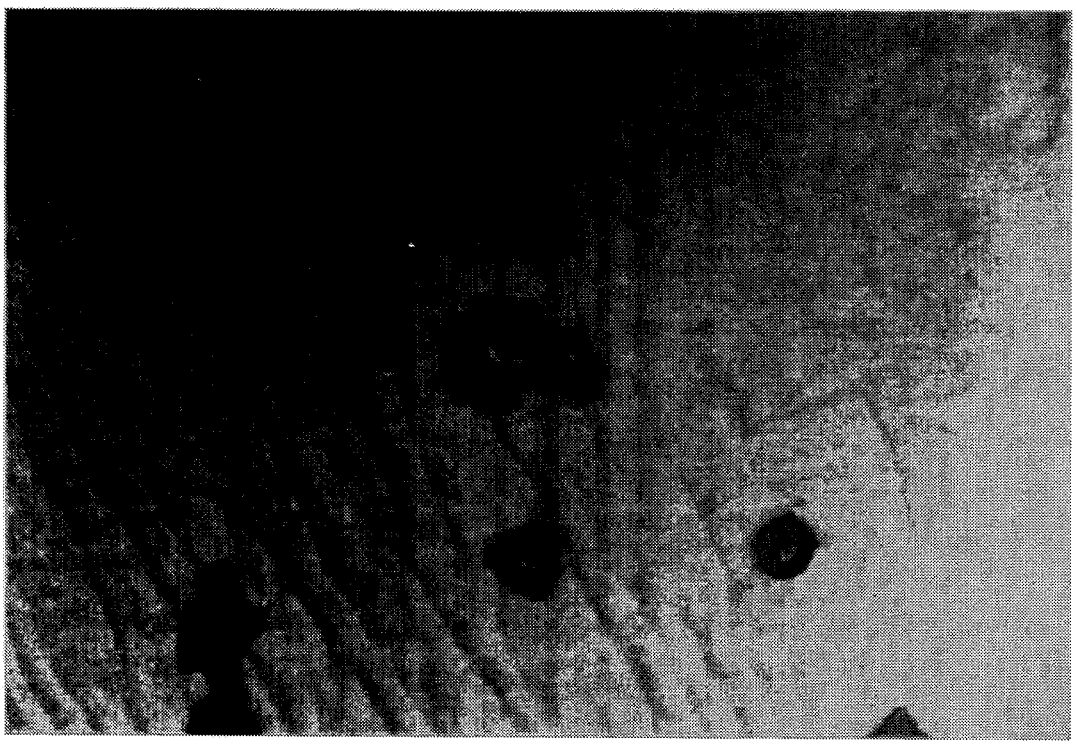

FIG. 7A shows the result of an injection of a dye onto a treated material, while FIG. 7B shows the corresponding injection of a dye onto an untreated material. FIG. 7C shows the wicking of water by a PET fabric, as compared to a drop of water on an untreated sample (which sat unaffected). FIG.

Figure 7E:
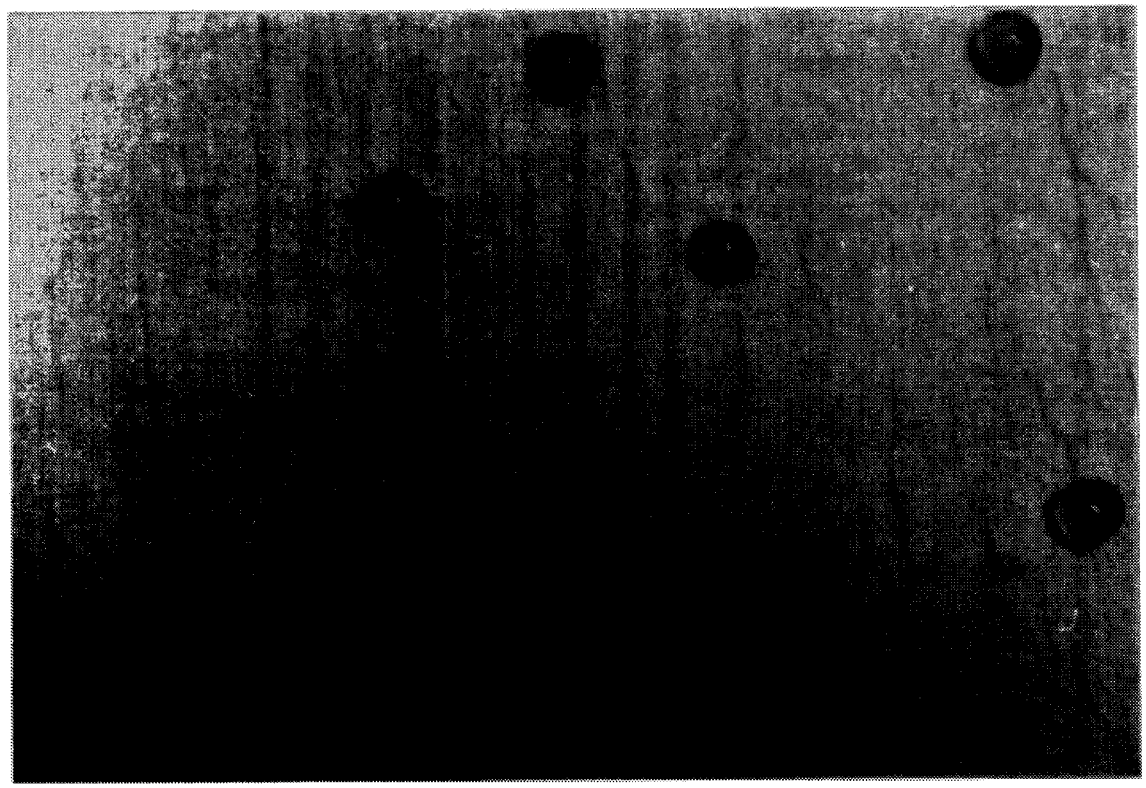

7D shows a wetted polypropylene material which was treated in accordance with the present invention, which is to be compared with the untreated material which is shown in FIG. 7E (where the formation of spherical drops is evident). Similar benefits are achievable with other synthetic fibers, both woven and unwoven.

The above-described apparatus 1 is capable of variation while achieving similar benefits, provided steps are taken to maintain a non electron absorbing gas layer in the vicinity of the electrodes.

For example, FIG. 8 shows an ionizing electrode 25 which can be used in place of the ionizing electrode 10 previously described. In this configuration, the ionizing electrode 25 is again comprised of a tubular body 11 having an end cap 13 for enclosing the tubular body 11 and an inlet 15 for receiving a gas. However, unlike the ionizing electrode 10, the apertures 18, 19 formed in the wall 17, as well as the pins 16, are replaced by a series of supply tubes 26 which extend from the wall 17 of the tubular body 11 and which communicate with the supply of gas contained by the tubular body 11. Each supply tube 26 terminates in an aperture 27, for delivering gas in the vicinity of each supply tube 26. The supply tubes 26 are in turn biased to an appropriate voltage (either through biasing of an electrically conducting tubular body 11, or through the separate biasing of supply tubes 26 associated with a non-conducting tubular body 11) to produce the discharge which is desired. In all other respects, operation of the alternative embodiment ionizing electrode 25 shown in FIG. 8 is substantially the same as operation of the ionizing electrode 10 shown in FIG. 2.

Figure 9:
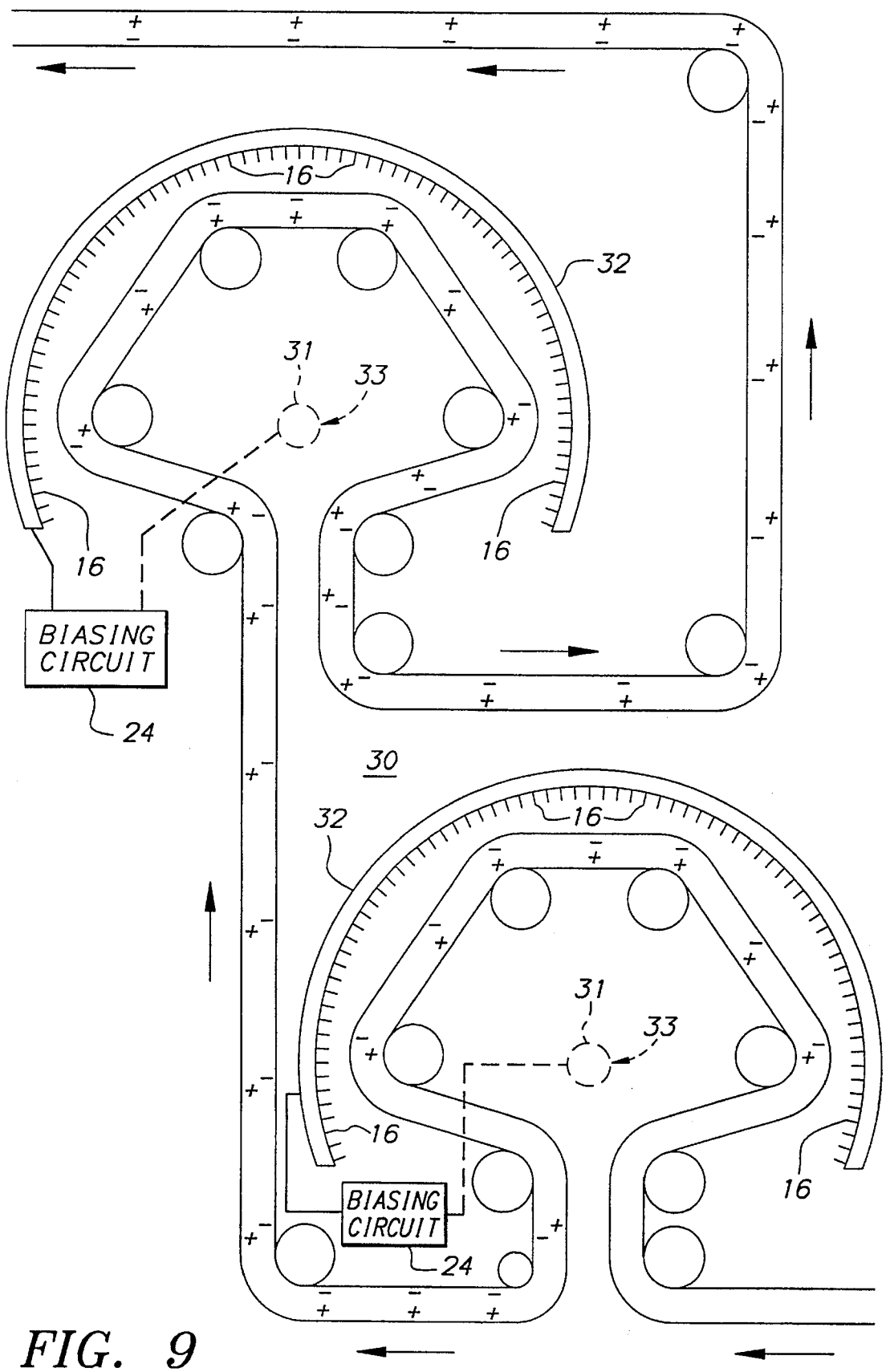
FIGS. 9 and 10 are schematic views of an alternative apparatus for electrostatically charging a web, which incorporate alternative means for delivering a non electron absorbing gas layer to the ionizing electrodes.

FIG. 9 shows an apparatus 30 for implementing the improvements of the present invention in conjunction with an alternative embodiment apparatus which incorporates a centrally disposed electrode 31 in conjunction with a peripherally disposed shell 32 which serves as the corresponding electrode of the system. In this configuration, the electrode 31 is provided with a series of apertures 33 for introducing a gas in the vicinity of the electrode 31. The corresponding shell 32 is formed as a hollow body, and incorporates a series of pins 16 extending outwardly from the shell 32 toward the electrode 31. The pins 16 are associated with the shell 32 much the same as are the pins 16 of the ionizing electrode 10 shown in FIG. 2, and an appropriate biasing circuit 24 is similarly provided. As a result, gas is introduced in the vicinity of the pins 16 extending from the shell 32. Consequently, in this case, a non electron absorbing gas layer is placed in the vicinity of each of the two electrodes 31, 32 forming the system. However, note that if desired, the central electrode 31 could be replaced with a conventional corona wire.

Figure 10:
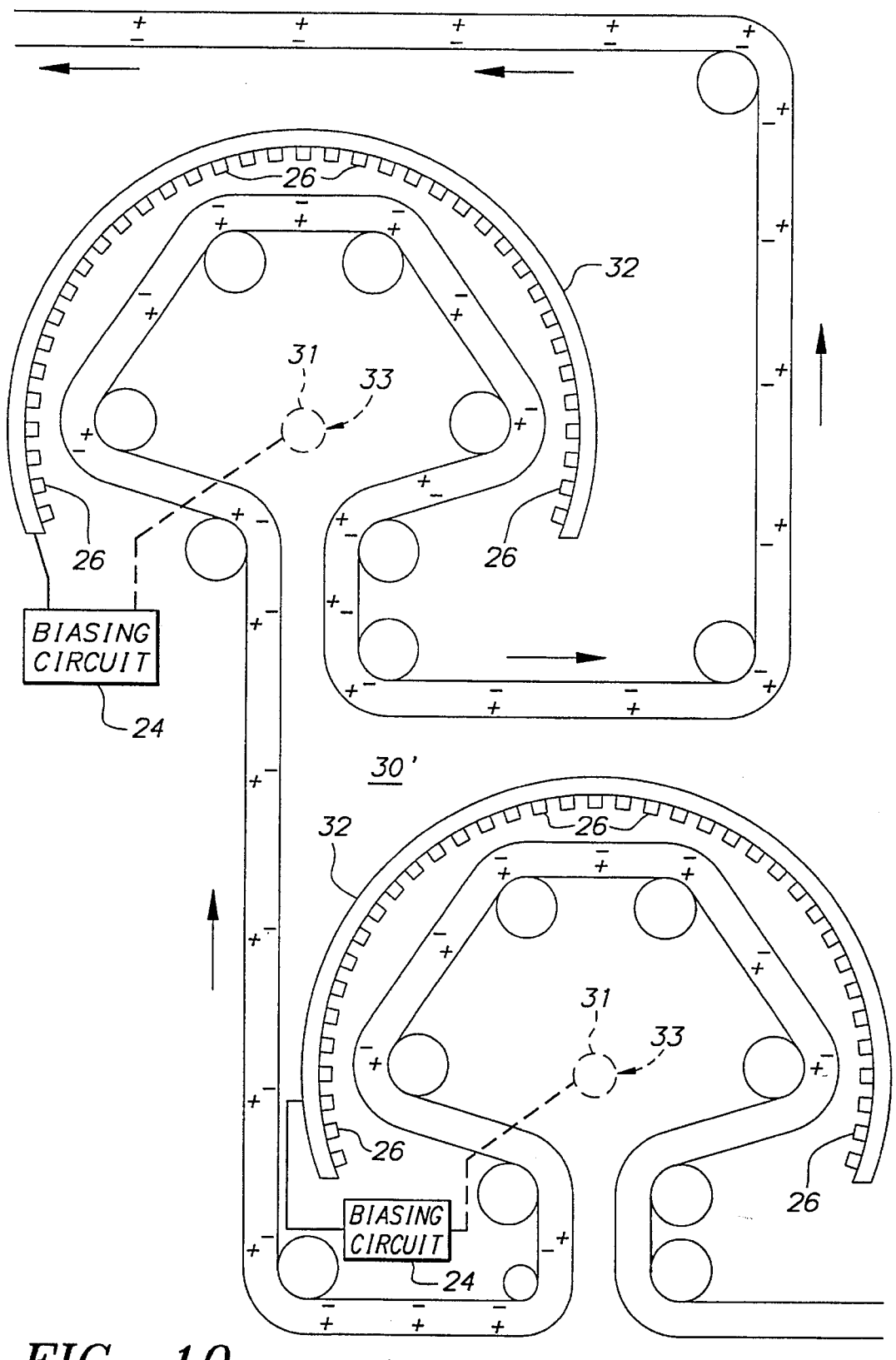

FIG. 10 shows an apparatus 30' similar to the apparatus 30 of FIG. 9, with the exception that the pins 16 associated with the shell 32 have been replaced by a series of supply tubes 26 similar to those used in conjunction with the ionizing electrode 25 of FIG. 8.

While the ionizing electrodes of the present invention are primarily directed to the treatment of fabrics, both woven and nonwoven, other uses for these electrodes are apparent. This includes applications such as the generation of ozone, flame control, electrostatic precipitators for pollution control, military radar stealth, plastics processing, metals processings, and the generation of atmospheric plasmas for general purpose use. Such improvements will also find applicability in the production of integrated circuit chips.

Fabrics electrostatically charged in accordance with the present invention will have many uses including moisture penetrable battery barriers (separators), electrostatic air filters, wound dressings, surgical face masks, pantyhose, synthetic fiber underwear, printing on synthetic materials, dyeing of synthetic materials, more comfortable rain clothing, more comfortable synthetic clothing, as well as fabric to fabric welding. Other applications will be apparent when the improvements of the present invention are understood.

It will therefore be understood that various changes in the details, materials and arrangement of parts which have been herein described and illustrated in order to explain the nature of this invention may be made by those skilled in the art within the principle and scope of the invention as expressed in the following claims.

What is claimed is:

1. An electrode for producing an ionized discharge, comprising a hollow tube for receiving a non electron absorbing gas therein, a plurality of apertures extending through the hollow tube for delivering the gas received in the hollow tube to surface portions of the hollow tube, and means for receiving a biasing voltage for producing an electrostatic discharge in the presence of a thin, non electron absorbing layer of the gas.

2. The electrode of claim 1 wherein the hollow tube includes paired series of apertures extending through diametrically opposing portions of the hollow tube, and a plurality of pins passing through opposing apertures of the paired series.

3. The electrode of claim 2 wherein first ends of the pins are in sealing engagement with the surface portions of the hollow tube, and wherein second ends of the pins pass through the apertures so that the gas is discharged from the apertures and around the second ends of the pins.

4. The electrode of claim 3 wherein the pins are formed of an electrically conducting material and the hollow tube is formed of an electrically conducting material, and wherein the biasing voltage is received by the hollow tube.

5. The electrode of claim 3 wherein the pins are formed of an electrically conducting material and the hollow tube is formed of an electrically non-conducting material, and wherein the biasing voltage is received by the plurality of pins.

6. The electrode of claim 1 wherein the hollow tube includes a plurality of supply tubes extending from the surface portions of the hollow tube and including apertures for receiving the gas from the hollow tube.

7. The electrode of claim 6 wherein the supply tubes are formed of an electrically conducting material and the hollow tube is formed of an electrically conducting material, and wherein the biasing voltage is received by the hollow tube.

8. The electrode of claim 6 wherein the supply tubes are formed of an electrically conducting material and the hollow tube is formed of an electrically non-conducting material, and wherein the biasing voltage is received by the plurality of supply tubes.

9. An apparatus for producing an ionized discharge, comprising a first electrode formed as a hollow tube for receiving a non electron absorbing gas therein, means for introducing the gas into the hollow tube, a plurality of apertures extending through the hollow tube for delivering the gas received in the hollow tube to surface portions of the hollow tube, a second electrode in operative association with the first electrode, and means for biasing the first electrode relative to the second electrode for producing an electrostatic discharge in the presence of a thin, non electron absorbing layer of the gas.

10. The apparatus of claim 9 wherein the hollow tube includes paired series of apertures extending through diametrically opposing portions of the hollow tube, and a plurality of pins passing through opposing apertures of the paired series.

11. The apparatus of claim 10 wherein first ends of the pins are in sealing engagement with the surface portions of the hollow tube, and wherein second ends of the pins pass through the apertures so that the gas is discharged from the apertures and around the second ends of the pins.

12. The apparatus of claim 11 wherein the pins are formed of an electrically conducting material and the hollow tube is formed of an electrically conducting material, and wherein the biasing voltage is received by the hollow tube.

13. The apparatus of claim 11 wherein the pins are formed of an electrically conducting material and the hollow tube is formed of an electrically non-conducting material, and wherein the biasing voltage is received by the plurality of pins.

14. The apparatus of claim 9 wherein the hollow tube includes a plurality of supply tubes extending from the surface portions of the hollow tube and including apertures for receiving the gas from the hollow tube.

15. The apparatus of claim 14 wherein the supply tubes are formed of an electrically conducting material and the hollow tube is formed of an electrically conducting material, and wherein the biasing voltage is received by the hollow tube.

16. The apparatus of claim 14 wherein the supply tubes are formed of an electrically conducting material and the hollow tube is formed of an electrically non-conducting material, and wherein the biasing voltage is received by the plurality of supply tubes.

17. The apparatus of claim 9 wherein the gas is selected from the group consisting of argon, helium, neon, nitrogen and propane.

18. The apparatus of claim 9 which further comprises a feed spool for receiving a web and a take-up spool for accepting the web, and means for rotating the feed spool and the take-up spool and for drawing the web of material between the first electrode and the second electrode.

19. The apparatus of claim 18 wherein the web is formed of a material selected from the group consisting of polyethylene terephthalate (PET), polypropylene, polyethylene and polyester.

20. A method for producing an ionized discharge with an apparatus including a first electrode formed as a hollow tube for receiving a gas therein, a plurality of apertures extending through the hollow tube for delivering the gas received in the hollow tube to surface portions of the hollow tube, and a second electrode in operative association with the first electrode, the method comprising the steps of:

introducing a non electron absorbing gas into the hollow tube, and biasing the first electrode relative to the second electrode, producing an electrostatic discharge in the presence of a thin, non electron absorbing layer of the gas.

21. The method of claim 20 for producing an ionized discharge, the method further comprising the step of de-enhancing the ionized discharge by including one or more electronegative gases in the gas introduced into the hollow tube.

22. The method of claim 20 for producing an ionized discharge wherein the gas is selected from the group consisting of argon, helium, neon, nitrogen and propane.

23. A method for improving the wettability of a fabric web, the method comprising treating the fabric web with an ionized discharge produced with an apparatus including a first electrode formed as a hollow tube for receiving a gas therein, a plurality of apertures extending through the hollow tube for delivering the gas received in the hollow tube to surface portions of the hollow tube, and a second electrode in operative association with the first electrode, whereby the ion discharge is produced by:

introducing a non electron absorbing gas into the hollow tube, and biasing the first electrode relative to the second electrode, producing an electrostatic discharge in the presence of a thin, non electron absorbing layer of the gas.

24. A method for improving the filtration ability of a fabric web, the method comprising treating the fabric web with an ionized discharge produced with an apparatus including a first electrode formed as a hollow tube for receiving a gas therein, a plurality of apertures extending through the hollow tube for delivering the gas received in the hollow tube to surface portions of the hollow tube, and a second electrode in operative association with the first electrode, whereby the ion discharge is produced by:

introducing a non electron absorbing gas into the hollow tube, and biasing the first electrode relative to the second electrode, producing an electrostatic discharge in the presence of a thin, non electron absorbing layer of the gas.

25. A moisture penetrable battery separator formed from a web treated with an ionized discharge produced with an apparatus including a first electrode formed as a hollow tube for receiving a gas therein, a plurality of apertures extending through the hollow tube for delivering the gas received in the hollow tube to surface portions of the hollow tube, and a second electrode in operative association with the first electrode, whereby the ion discharge is produced by:

introducing a non electron absorbing gas into the hollow tube, and biasing the first electrode relative to the second electrode, producing an electrostatic discharge in the presence of a thin, non electron absorbing layer of the gas.

26. A method for producing ozone by treating a molecular oxygen containing gas with an ionized discharge produced with an apparatus including a first electrode formed as a hollow tube for receiving a gas therein, a plurality of apertures extending through the hollow tube for delivering the gas received in the hollow tube to surface portions of the hollow tube, and a second electrode in operative association with the first electrode, whereby the ion discharge is produced by:

introducing a non electron absorbing gas into the hollow tube, and biasing the first electrode relative to the second electrode, producing an electrostatic discharge in the presence of a thin, non electron absorbing layer of the gas.

27. A method of effecting fabric to fabric welding by treating at least one of the fabrics with an ionized discharge produced with an apparatus including a first electrode formed as a hollow tube for receiving a gas therein, a plurality of apertures extending through the hollow tube for delivering the gas received in the hollow tube to surface portions of the hollow tube, and a second electrode in operative association with the first electrode, whereby the ion discharge is produced by:

introducing a non electron absorbing gas into the hollow tube, and biasing the first electrode relative to the second electrode, producing an electrostatic discharge in the presence of a thin, non electron absorbing layer of the gas.

28. An electrode for producing an ionized discharge for electrostatically charging a web, comprising:

a hollow body having an outer surface;

means for supplying a non electron absorbing gas within the hollow body;

a plurality of apertures formed in the hollow body and extending to the outer surface of the hollow body so that a thin, non electron absorbing layer of the gas is delivered to the outer surface of the hollow body; and means associated with the hollow body and extending from the outer surface for producing an electrostatic discharge in the presence of the non electron absorbing gas layer.

29. An apparatus for electrostatically charging a web, comprising:

a first electrode for producing an ionized discharge, including a hollow body having an outer surface, means for supplying a non electron absorbing gas within the hollow body, and a plurality of apertures formed in the hollow body and extending to the outer surface of the hollow body so that a thin, non electron absorbing layer of the gas is delivered to the outer surface of the hollow body;

a second electrode in operative association with the first electrode; and means associated with the hollow body of the first electrode and extending from the outer surface, in combination with means for biasing the first electrode relative to the second electrode to produce an electrostatic discharge in the presence of the non electron absorbing gas layer.

30. A method for electrostatically charging a web with an apparatus comprising a first electrode including a hollow body having an outer surface and a plurality of apertures formed in the hollow body and extending to the outer surface of the hollow body, and a second electrode in operative association with the first electrode, the method comprising the steps of:

introducing a non electron absorbing gas into the hollow body, forming a thin, non electron absorbing layer of the gas along the outer surface of the hollow body; and biasing the first electrode relative to the second electrode, producing an electrostatic discharge in the presence of the non electron absorbing gas layer.

31. An ionized discharge produced with an electrode comprising a hollow tube for receiving a non electron absorbing gas therein, a plurality of apertures extending through the hollow tube for delivering the gas received in the hollow tube to surface portions of the hollow tube, and means for receiving a biasing voltage for electrostatically ionizing the discharge in the presence of a thin, non electron absorbing layer of the gas.

32. A method for electrostatically charging a web, comprising the steps of:

producing an ionized discharge with an apparatus including a first electrode formed as a hollow tube for receiving a gas therein, a plurality of apertures extending through the hollow tube for delivering the gas received in the hollow tube to surface portions of the hollow tube, and a second electrode in operative association with the first electrode;

introducing a non electron absorbing gas into the hollow tube, and biasing the first electrode relative to the second electrode, producing an electrostatic discharge in the presence of a thin, non electron absorbing layer of the gas.

* * * * *